United States Patent [19]

Yoshino et al.

[11] Patent Number: 4,837,814
[45] Date of Patent: Jun. 6, 1989

[54] TELEPHONE SET

[75] Inventors: Yutaka Yoshino, Isehara; Makoto Gotoh, Atsugi; Osamu Fujimoto, Tokyo; Masahiro Shizawa, Atsugi, all of Japan

[73] Assignee: Anritsu Corporation, Tokyo, Japan

[21] Appl. No.: 100,283

[22] Filed: Sep. 23, 1987

[30] Foreign Application Priority Data

Sep. 29, 1986 [JP] Japan .................. 61-230299
Sep. 29, 1986 [JP] Japan .................. 61-230300

[51] Int. Cl.⁴ ............................... H04M 17/02
[52] U.S. Cl. ........................ 379/144; D14/146
[58] Field of Search .......... 379/144, 123, 130–132, 379/424, 91, 146–155, 357; D14/55, 52, 61

[56] References Cited

U.S. PATENT DOCUMENTS 4,698,840 10/1987 Dively et al. .................. 379/132

OTHER PUBLICATIONS

Innovation "Makes Elcotel Dealers ... Leaders", Elcotel Inc., Sarasota, Fla.
Protel brochure for Line Powered Universal Public Telephone Retrofit Kit, Protel, Inc., Lakeland, Fla., May 1987.
Make A Universal Decision—Ernest Telecom's Universal II—The Universal Decision, Ernest Telecom Inc., Norcross, Ga.

Primary Examiner—James L. Dwyer
Attorney, Agent, or Firm—Frishauf, Holtz, Goodman & Woodward

[57] ABSTRACT

In a telephone set which can be used by inserting a card, a slit-like card insertion port is formed at a portion behind a handset hung up on a hanger of a surface of a housing and a card reader is arranged behind the card insertion port. A projecting hanger assembly is formed on the housing. A hanger portion for receiving the handset is formed at an upper portion of the hanger assembly, and hollow projections are formed at a lower portion thereof. Slits of the card insertion port are formed in the distal end faces of the projections, and the card reader is partially housed in the projections.

10 Claims, 9 Drawing Sheets

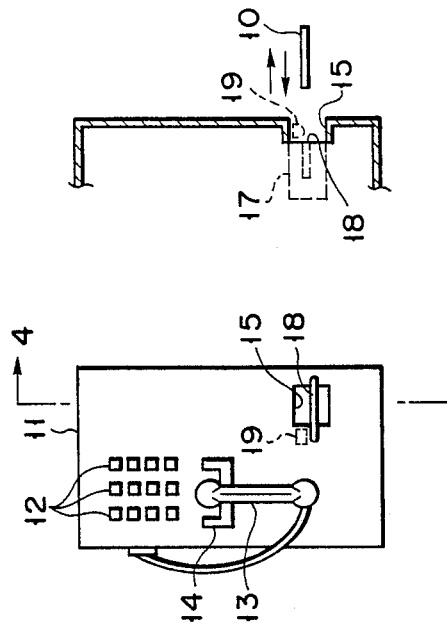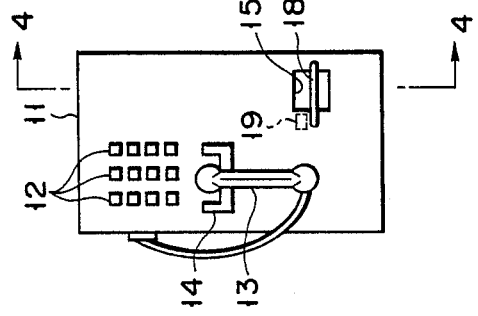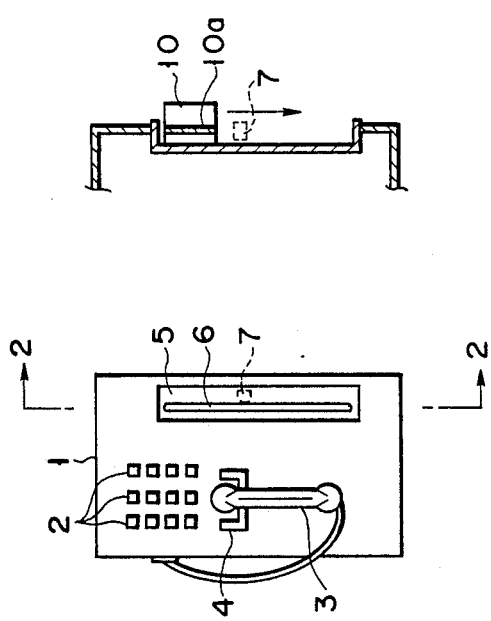

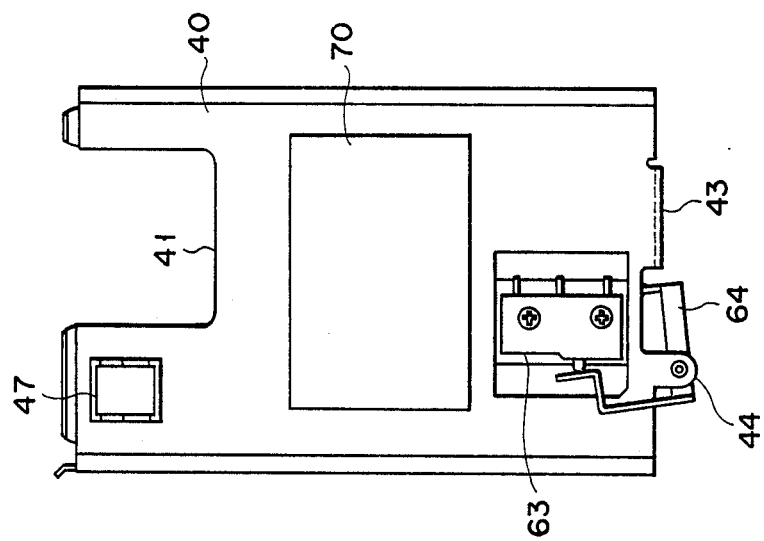
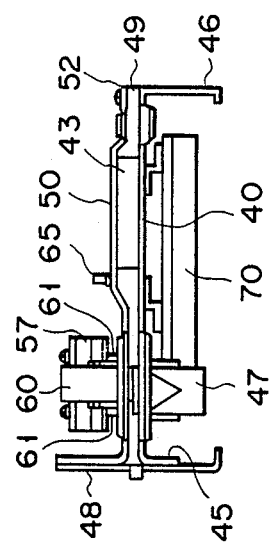

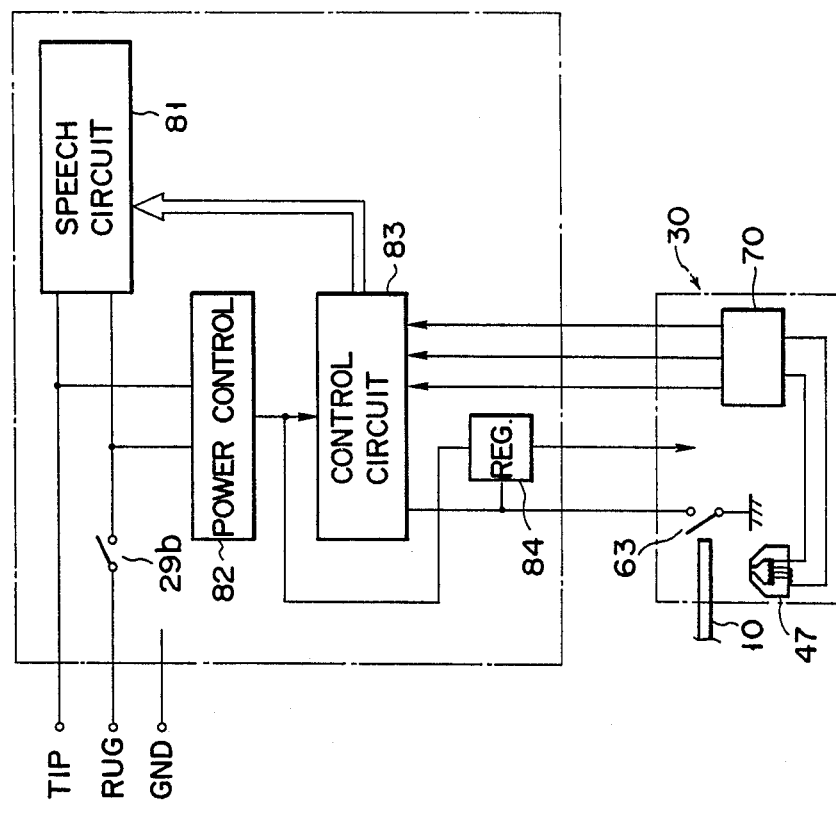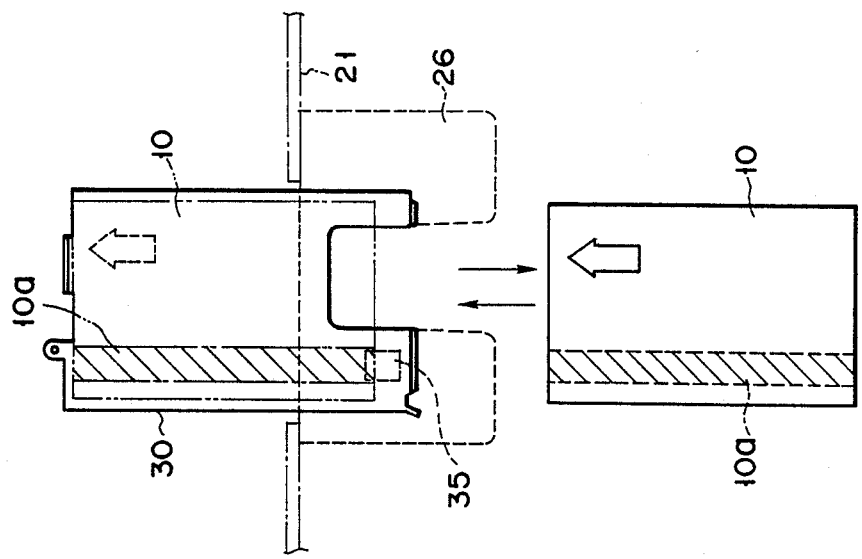

TELEPHONE SET

BACKGROUND OF THE INVENTION

The present invention relates to a telephone set and, more particularly, to a telephone set which can be used by inserting a card.

Some public telephone sets which have been recently developed can allow automatic transfer service of telephone charges by reading magnetic information recorded in a magnetic card such as a commercial credit card and hence can be used without inserting a coin. Such a telephone system will be widespread in a near future.

In a telephone set used in such a telephone system, a card insertion port is formed in addition to a coin slot, and a card reader for reading magnetic information recorded on the card is provided behind the card insertion port. As the card reader, a manual type card reader is most widely used. In this case, a user moves the card inserted in the card reader by his or her hand to read magnetic information recorded on the card.

The above telephone sets are classified into two types in accordance with structures of the card reader. A public telephone set of the first type is schematically shown in FIGS. 1 and 2. FIG. 1 is a front view of the telephone set, and FIG. 2 is a schematic sectional view taken along the line 2—2 of FIG. 1. In FIGS. 1 and 2, reference numeral 1 denotes a housing of the public telephone set; 2, a plurality of dialing keys; 3, a handset; and 4, a hanger for handset 3. Card insertion groove 6 is vertically formed on a front surface of housing 1. Card reader 5 is provided behind groove 6.

In order to use this public telephone set, a user first takes up handset 3 from hanger 4. Then, the user inserts card 10 into card reader 5 through groove 6 and slides it down along groove 6. While card 10 is slid, head 7 of card reader 5 reads magnetic information recorded in magnetic strips 10a of card 10. The readout data is subjected to processing such as identification by a processor provided inside or outside the telephone set, and a speech circuit is connected. Then, the user operates keys 2 to make a call.

A public telephone set of the other type is shown in FIGS. 3 and 4. FIG. 3 is a front view of the telephone set, and FIG. 4 is a schematic sectional view taken along the line 4—4 of FIG. 3. In FIGS. 3 and 4, reference numeral 11 denotes a housing of the public telephone set; 12, a plurality of dialing keys; 13, a handset; 14; a hanger for handset 14. Card insertion slit 18 is horizontally formed on a front surface of housing 11. The length of slit 18 corresponds to the width of a card. Recess 15 is formed at a central portion of slit 18. Card reader 17 is provided behind slit 18.

In this telephone set, card 10 is inserted into card reader 17 through slit 18 and then removed therefrom. During insertion or removal of card 10, head 19 of card reader 17 reads magnetic information recorded in a magnetic stripe of card 10. Recess 15 assures a space for fingers so that they are not brought into contact with a housing wall defining slit 18 when the user pinches an end portion of card 10 to insert/remove it. Except for the above description, this second telephone set has the same arrangement and operation as those of the first telephone set.

However, the public telephone set used by a card as described above poses a serious problem in which a user is expected to erroneously operate the telephone set before such a telephone system is completely widespread. A most frequent erroneous operation in the future on the basis of the wealth of experiences is such that a card is inserted in a card reader before a handset of the telephone set is taken up from a hanger. An existing telephone set of this type used by a card does not read magnetic information recorded in a card if the card is inserted in a card reader before a handset is taken up from a hanger. That is, in this case, the telephone set cannot be used. Therefore, a user may be confused or may determine that the telephone set malfunctions without noticing his or her wrong operation procedures.

Moreover, in the telephone sets as described above, in order to form a card insertion slit on a front surface of a housing, a front surface area of the housing is increased, so that the size of the telephone set is undesirably increased. Especially in the telephone set of the first type, since a groove having a length twice the length of the card, the housing is further bulky. In the telephone set of the second type, if a piece of paper or the like is inserted in the card insertion slit by mischief or the like, a card cannot be normally inserted therein.

In addition, in order to make a housing of such a public telephone set compact, various improvements have been conventionally made. Examples are Model 1200-2 of EL COTEL Inc., 8425 Whitfield Park Loop, Sarasota, Fla. 34243, U.S.A., UNIVERSALL-7EW-VF of ERNEST TELECOM Inc., 6475 Jimmy Carter Blvd., Suite Tree Hundred, Norcross, Ga. 30071, U.S.A., and CTR-600/700 of PORTEL Inc., 412 Longfellow Boulevard, Lakeland, Fla. 33801, U.S.A. In each of the sets exemplified above, dialing keys are arranged below a hanger. When a handset is hooked on the hanger, the dialing keys are located behind the handset. That is, a portion where the handset is hung up is the same as that where the dialing keys are located. Therefore, the front surface area of the housing can be reduced, so that the entire set can be made compact. In the product of ERNEST TELECOM Inc., a projection is formed on the housing front surface at a position immediately below a lower end of a handset hung up on a hanger, and a card reader of the first type, i.e., a slide type card reader is provided to the projection, thereby reducing the front surface area of the housing. In the product of PORTEL Inc., a projection is formed at a position corresponding to a lower end of a handset hung up on a hanger, as described above, and a card reader of the second type, i.e., an insertion/removal type card reader is provided in the projection. This card reader is arranged to be inclined downward toward the front surface, and a card is inserted obliquely upward. With the above arrangement, the front surface area of the housing is reduced, and the entire telephone set is made compact.

SUMMARY OF THE INVENTION

It is a first object of the present invention to physically prevent a user's erroneous operation in a telephone set used by a card.

It is a second object of the present invention to provide a convenient telephone set which is made compact by minimizing a front surface area of a housing thereof.

The above objects of the present invention are achieved by forming a card insertion slit at a portion behind a handset hung up on a hanger, i.e., a portion covered with the handset on a front surface of a housing of a telephone set, and by arranging a card reader behind the slit to read magnetic information of the card when the card is inserted and removed.

With this arrangement, a user cannot insert a card into a card reader unless he or she takes up a handset from a hanger. Therefore, an erroneous operation is physically prevented and hence the user is no longer confused.

In addition, with the above arrangement, an area where the card reader is arranged is the same as that where the handset is hung up on the hanger, thereby reducing the front surface area of the housing. Note that although an opening area of the card insertion slit formed in the front surface area of the housing is small, an area occupied by the card reader arranged behind the slit, its mounting member, wiring, and the like is relatively large. Actually, this area is the same as or larger than that required for arranging dialing keys. Therefore, the housing front surface area which is reduced by arranging the slit and the card reader behind the handset hung up on the hanger becomes the same as or larger than that reduced by arranging the dialing keys behind the handset. Moreover, operability of the telephone set is improved by this arrangement. That is, for a user, a dialing operation is more complex than an operation of inserting a card into a card reader. That is, the card operation consists of simple two steps, i.e., a card insertion step and a card removal step. However, in order to perform the dialing operation, the user must depress the dialing keys a plurality of times while checking numerals printed on the respective keys. In addition, a position behind the handset hung up on the hanger is not a suitable place for operations for a user. Therefore, if the slit and the card reader are arranged behind the handset and the dialing keys are arranged at a position having good operability, e.g., to the right of or above the hanger, the operability of the telephone set is improved. If the card insertion slit is arranged behind the handset, trouble caused by insertion of a piece of paper or the like into the slit by mischief can be reduced. That is, in order to insert the piece of paper or the like into the slit, the handset must be taken up from the hanger. Therefore, it is assumed that few people try to do such a thing by taking up the handset from the hanger.

According to an embodiment of the present invention, a projection is formed immediately below and integrally with the hanger, the card insertion slit is formed at the distal end face of the projection, and part of the card reader is housed in the projection. A vertical groove for housing a grip portion of the handset is formed at a central portion of the projection. This groove also assures a space for fingers when the user pinches the card. In this embodiment, since part of the card reader is housed in the projection, a depth of the housing can be reduced. Moreover, the projection formed integrally with the hanger can strengthen the hanger. This hanger structure assembly with a complicated shape can be manufactured by injection molding of a synthetic resin, thereby reducing manufacturing cost.

BRIEF DESCRIPTION OF THE DRAWINGS

The present invention will become more apparent from the following description taken in conjunction with the accompanying drawings, in which;

FIG. 1 is a schematic front view of a conventional telephone set of the first type;

FIG. 2 is a schematic sectional view of the telephone set shown in FIG. 1 taken along the line 2—2 thereof;

FIG. 3 is a schematic front view of a conventional telephone set of the second type;

FIG. 4 is a schematic sectional view of the telephone set shown in FIG. 1 taken along the line 4—4 thereof;

FIG. 8 is a front view of the card reader shown in FIG. 7;

FIG. 9 is a bottom view of the card reader shown in FIG. 8;

FIG. 10 is a schematic plan view for explaining a card insertion state;

FIG. 11 is a block diagram of the card reader and a telephone network;

DETAILED DESCRIPTION OF THE PREFERRED EMBODIMENTS

Figure 6:
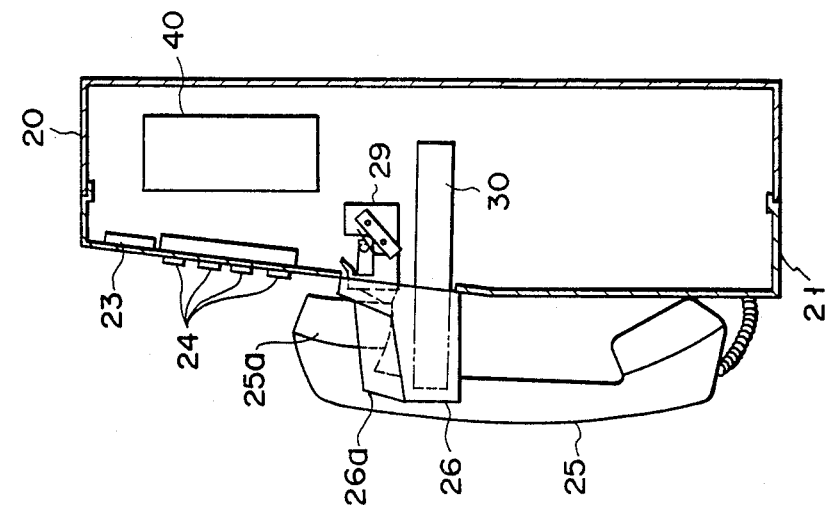
FIG. 6 is a schematic longitudinal sectional view of the telephone set shown in FIG. 5.
Figure 5:
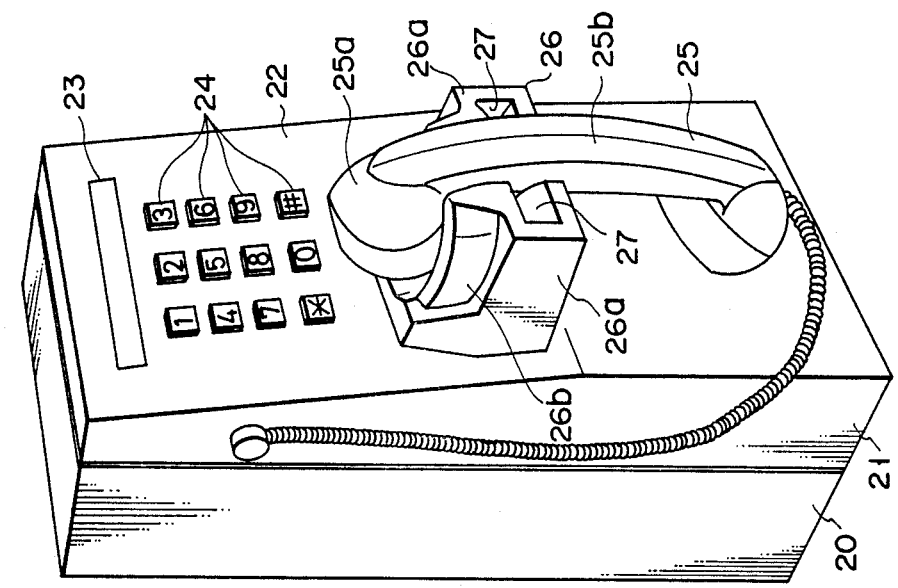
FIG. 5 is a perspective view of a telephone set according to an embodiment of the present invention.
Figure 7:
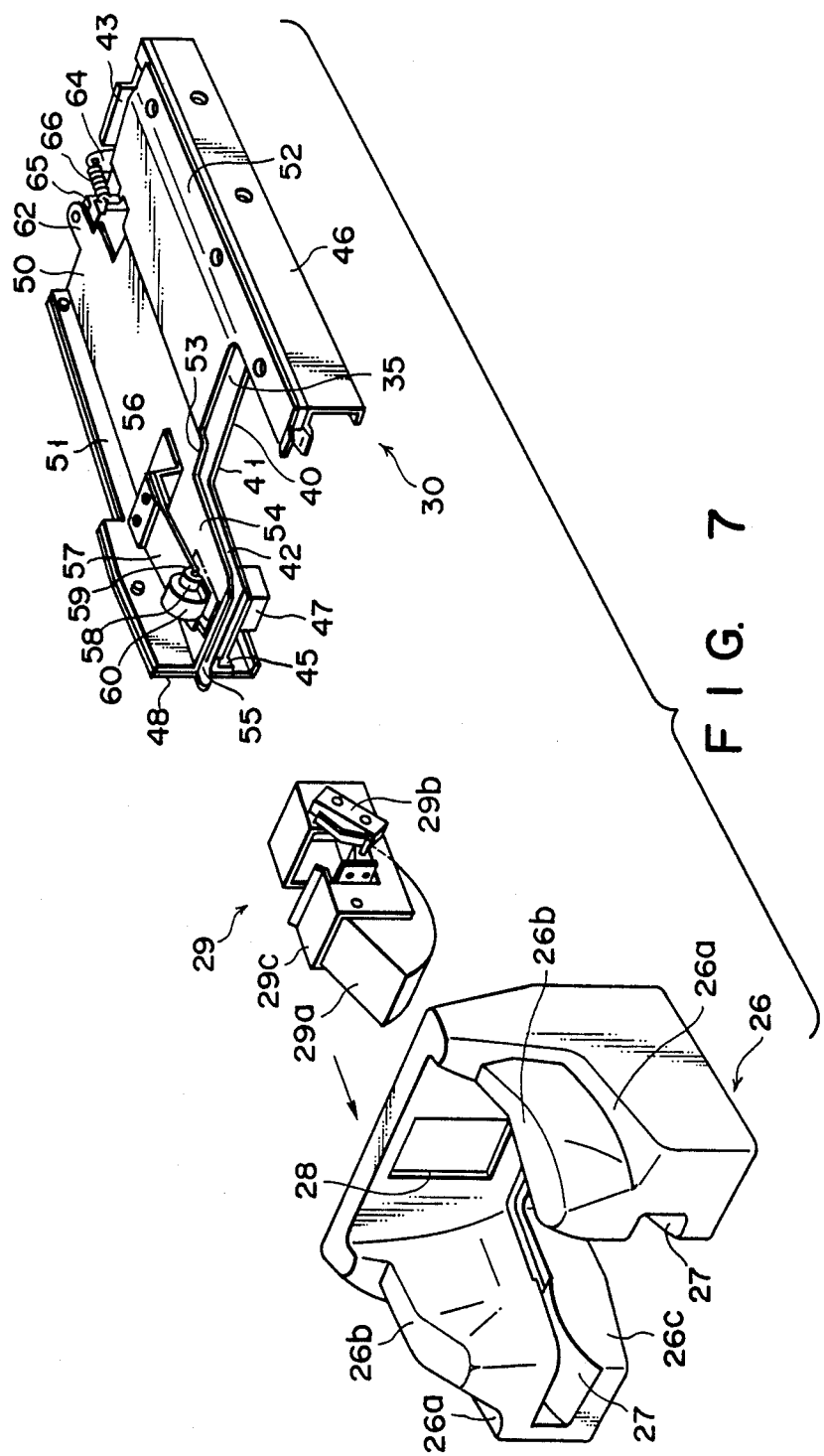
FIG. 7 is an exploded perspective view of a hanger and a card reader of the telephone set shown in FIG. 5.

Embodiments of the present invention will be described in detail with reference to the accompanying drawings.

FIGS. 5 to 11 show a public telephone set according to a first embodiment of the present invention. This telephone set includes a housing. The housing includes box-like main body 20 and front door 21 which is mounted to main body 20. Panel 22 is mounted on a front surface of door 21. Display 23 for displaying telephone numbers and the like is mounted at an upper end portion of panel 22. Dialing keys 24 are arranged below display 23.

Hanger structure assembly 26 projects from below keys 24. Assembly 26 is formed by injection molding of, e.g., a synthetic resin material, and a pair of projections 26a which project forward are formed on a lower portion of assembly 26. A pair of receiving portions 26b are formed on an upper portion of assembly 26 and integral with projections 26a. Receiving portions 26b are arc-shaped, and a substantially spherical recess is formed therebetween. The recess receives receiver 25a of handset 25 to reliably hold handset 25 in a hung state. Groove-like recess 26c which vertically extends through assembly 26 is formed between projections 26a to house grip 25b of handset 25 supported by hanger portion 26b.

Hook hole 28 is formed at the substantially central portion of a deep wall portion of assembly 26, and hook switch 29 is provided behind hole 28. Switch 29 consists of sector-shaped pivotal member 29a, switch 29b which is opened/closed in correspondence to pivotal movement of the pivotal member, and U-shaped support member 29c for pivotally supporting pivotal member 29a and for holding switch 29b. Pivotal member 29a is biased by a spring (not shown) to project forward. Therefore, when handset 25 is taken up from hanger portions 26b, pivotal member 29a is pivoted by the biasing force of the spring, so that microswitch 29b is operated to engage the telephone set with a channel.

The interior of each projection 26a of assembly 26 is made hollow. Slit-like card insertion port 27 in which a magnetic card is inserted is formed from the distal end faces of projections 26a to opposing side surfaces thereof. The slits of port 27 near the front end faces of projections 26a are widened so that a card can be smoothly inserted. Card reader 30 is provided behind port 27. Part of card reader 30, i.e., a front end portion thereof is housed in projections 26a of assembly 26.

Card reader 30 includes card housing portion 35. A card inserted from port 27 is inserted in housing portion 35. Housing portion 35 is constituted by lower base plate 40 and upper base plate 50 vertically spaced apart from each other by a predetermined distance and arranged parallel to each other. U-shaped notches 41 and 53 are formed in front end portions of lower and upper base plates 40 and 50, respectively. Shapes of notch portions 41 and 53 correspond to a shape of the recess formed between projections 26a of assembly 26. As shown in FIG. 10, the recess and notches 41 and 53 assure a space for fingers so that they are not brought into contact with a wall portion of assembly 26 when the user pinches card 10 to insert or remove it.

Left side edges of lower and upper base plates 40 and 50 are bent to be an L-shape to form flanges 45 and 51, respectively. Flanges 45 and 51 are mounted on side plate 48. The right side edges of lower and upper base plates 40 and 50 coupled with each other by screws through spacer 49 having a predetermined thickness. Flange 46 is formed at the right side edge of lower base plate 40.

Magnetic head 47 is mounted on projecting portion 42 of lower base plate 40. The distal end portion of head 47 slightly projects through projecting portion 42 and contacts magnetic stripe 10a of inserted card 10 to read magnetic information recorded therein. Square hole 55 is formed in projecting portion 54 of upper base plate 50 in correspondence to head 47. Leaf spring 57 is mounted on upper base plate 50 through mounting member 56, and free end 38 of spring 57 is located above hole 55. Roller 60 is rotatably mounted to end 38 of spring 57 through shaft 59. Roller 60 urges a rear surface of inserted card 10 by the biasing force of spring 57 so as to bring stripe 10a of card 10 into contact with head 47. Stoppers 61 project form both sides of hole 55, respectively. Stoppers 61 abut against shaft 59 to limit downward movement of roller 60. Roller 60 slightly contacts head 47 when card 10 is not inserted.

Support projections 44 and 62 project from rear end portions of lower and upper base plates 40 and 50, respectively. Switch lever 64 is horizontally pivotally mounted between support projections 44 and 62. Spring support projection 65 projects upward from the rear end portion of upper base plate 50. Tension coil spring 66 is extended between support projection 44 and one end of lever 64. One end of lever 64 is biased to move forward by the biasing force of spring 66. When card 10 is inserted to a predetermined position in card reader 30, a leading edge of card 10 abuts against one end portion of lever 64 and pivots lever 64 against the biasing force of spring 66, so that switch 63 arranged at the other end portion of lever 64 is operated.

Signal transmitter 70 is arranged on a lower surface of lower base plate 40. Signals from head 47 are output through signal transmitter 70.

Circuits of the above telephone set will be briefly described below with reference to FIG. 11. In FIG. 11, reference numeral 81 denotes a speech circuit which constitutes part of a speech network of the entire telephone set. The telephone set includes power control 82, control circuit 83, and voltage regulator 84 in its housing. Reference numeral 29b denotes a switch of hanger assembly 26. When handset 25 is taken up from hanger assembly 26, hanger switch 29b is closed, control 82 is operated, and power is applied to the control circuit. When card 10 is inserted into card reader 30, as shown in FIG. 10, switch 63 is operated, control circuit 83 powers on voltage regulator 84, and card reader 30 is operated. When card 10 is removed, magnetic information recorded in magnetic stripe 10a of card 10 is read by head 47. This signal is supplied to control circuit 83, thereby performing processing such as discrimination. When a user operates the dialing keys, the telephone set supplies card data and a called-party telephone number to a telephone office through speech circuit 81, thereby making a call.

Figure 12:
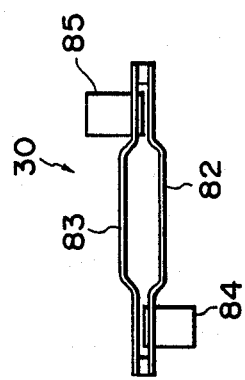
FIG. 12 is a front view of a card reader according to another embodiment of the present invention.

FIG. 12 is a schematic front view of card reader 30 according to another embodiment. In card reader 30, lower base plate 82 and upper base plate 83 are symmetrical about the longitudinal central line, and magnetic heads 84 and 85 are provided at the left portion of lower base plate 82 and at the right portion of upper base plate 85, respectively. Card reader 30 can read magnetic information recorded in a magnetic stripe of a card even if the magnetic stripe of the inserted card faces upward or downward.

Figure 13:
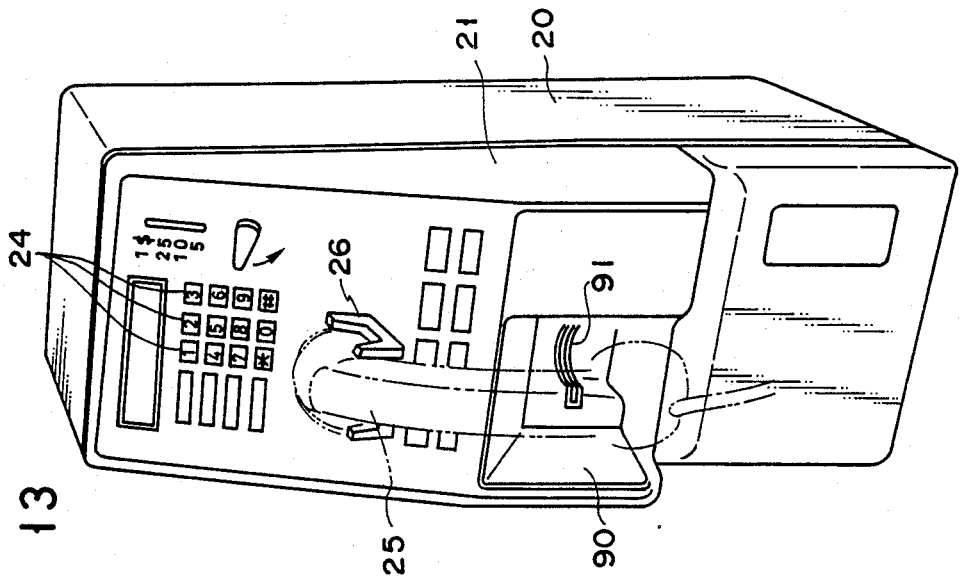
FIG. 13 is a perspective view of a telephone set according to still another embodiment of the present invention.

FIG. 13 shows a telephone set according to still another embodiment. In this telephone set, recess 90 is formed at a portion corresponding to the lower half of handset 25 hung up on hanger 26. Card insertion port 91 is provided in a deep wall portion of recess 90, i.e., a portion behind handset 25. A card reader similarly to that of the above embodiment is provided behind port 91. Other arrangements of this embodiment are the same as those of the above embodiment.

Figure 14:
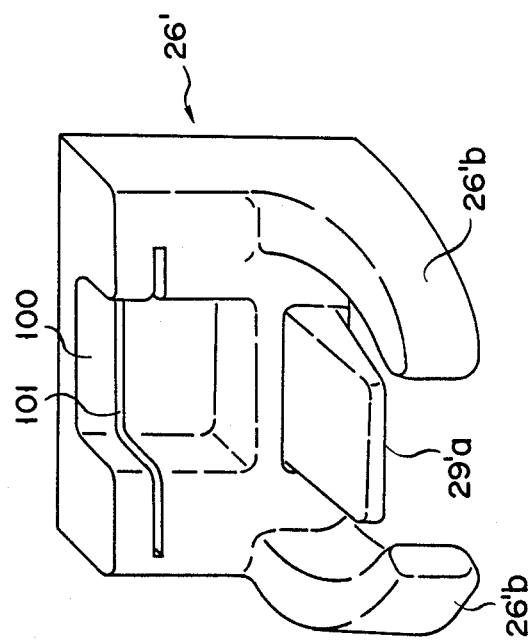
FIG. 14 is a perspective view of another embodiment of a hanger structure assembly.

FIG. 14 shows another embodiment of the hanger structure assembly. In this embodiment, recess 100 is formed above hanger portion 26b' of hanger structure assembly 26', and card insertion port 101 is formed across recess 100.

Figure 15:
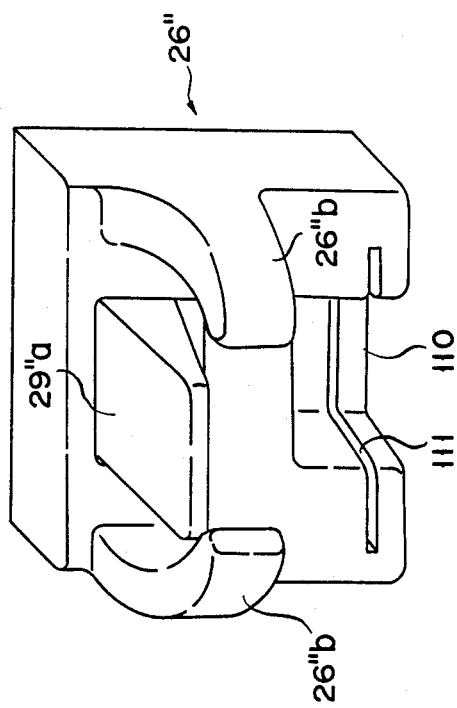
FIG. 15 is a perspective view of still another embodiment of the hanger structure assembly.

FIG. 15 shows still another embodiment of the hanger structure assembly. In this embodiment, recess 110 is formed below hanger portion 26b'' of hanger structure assembly 26'', and card insertion port 111 is formed across recess 110. In the embodiments shown in FIGS. 14 and 15, each of recesses 100 and 110 forms a space for fingers of a user when the user inserts a card.

Figure 17:
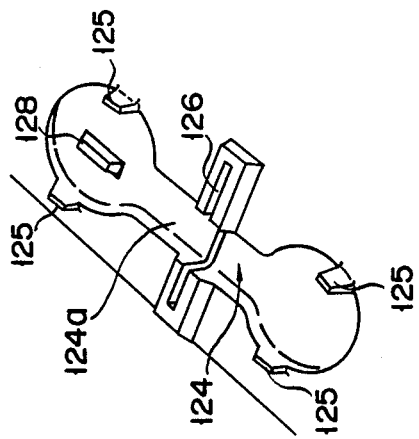
FIG. 17 is a perspective view of a hanger recess portion of the telephone set shown in FIG. 16.
Figure 16:
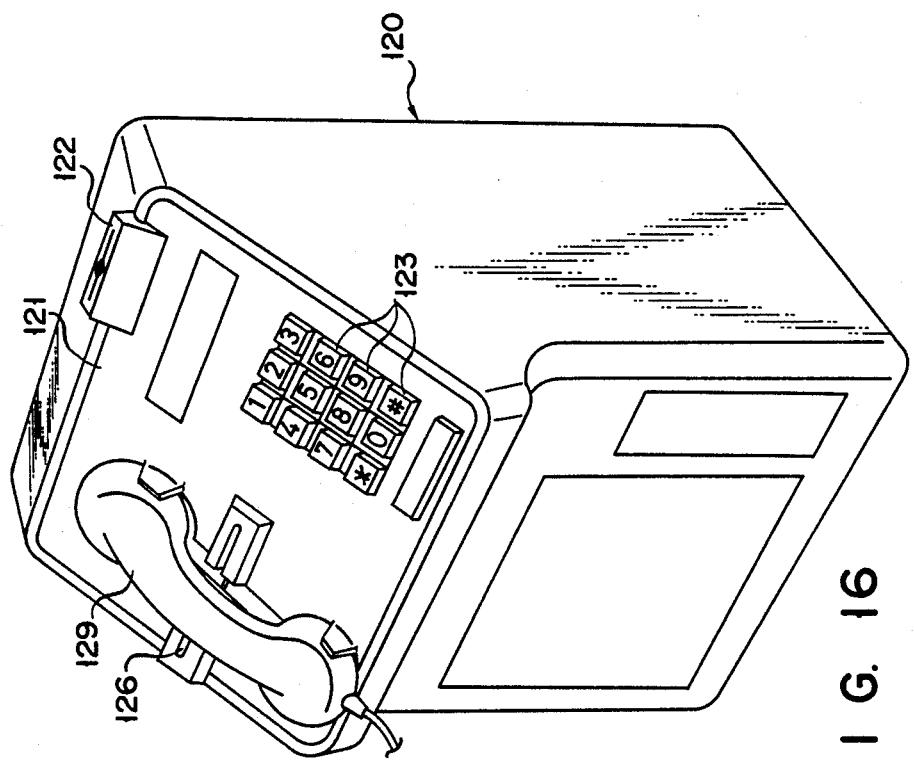
FIG. 16 is a perspective view of the telephone set according to still another embodiment.

FIG. 16 shows till another embodiment of the telephone set of the present invention. In this embodiment, housing 120 of the telephone set includes inclined front panel 121. Coin slot 122 and dial keys 123 are provided on panel 121. Hanger recess 124 as shown in FIG. 17 is also formed in panel 121. A shape of recess 124 corresponds to that of handset 129. Handset 129 is fitted in and held by recess 124. Note that reference numeral 128 denotes a hook switch; and 125, a guide projection for preventing offset of handset 129. Card insertion port 126 is formed across portion 124a of recess 124 which corresponds to a grip portion of handset 129. Recess 124 forms a space for fingers of a user when the user inserts a card.

Figure 18:
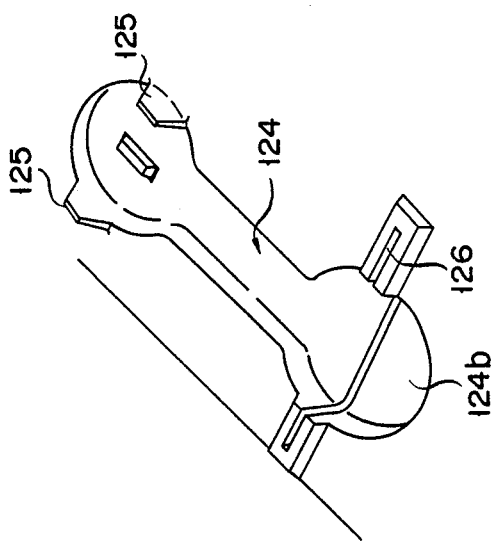
FIG. 18 is a perspective view of another embodiment of the hanger recess portion.

FIG. 18 shows another embodiment of hanger recess 124. In this embodiment, card insertion port 126 is formed across portion 124b of recess 124 which corresponds to a transmitter of handset 129.

Figure 19:
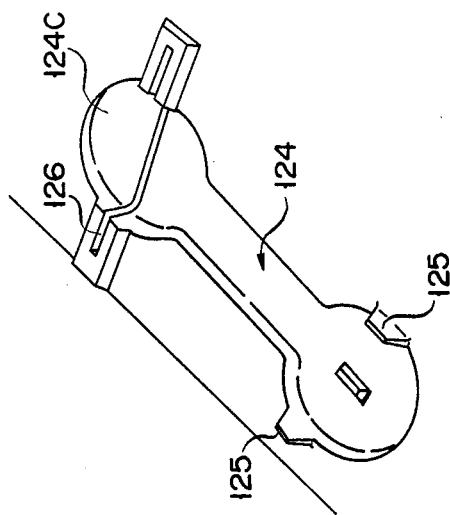
FIG. 19 is a perspective view of still another embodiment of the hanger recess portion.

FIG. 19 shows still another embodiment of hanger recess 124. In this embodiment, card insertion port 126 is formed across portion 124c of recess 124 which corresponds to a receiver of handset 129.

The present invention is not limited to any of the above embodiments. For example, a card to be used is not limited to a debit card. That is, the present invention can be applied to a telephone set which can be used by an IC card, a card with optically recorded information, and the like. In these cases, instead of the card reader of the above embodiments, card readers for the respective cards may be provided.

It is obvious to a person of an ordinary skill in the art that the present invention is not limited to the above embodiments but can be arbitrarily improved and modified without departing from the spirit and scope of the present invention.

What is claimed is:

1. A telephone set comprising a housing, hanger means provided on said housing, a handset adapted to be hung up on said hanger means, a slit-like card insertion port on a surface of said housing and in which a card is insertable, wherein:

said slit-like card insertion port is formed on a portion of the surface of said housing located behind said handset when said handset is hung up on said hanger means; and said card reader is arranged behind said card insertion port.

2. A telephone set according to claim 1, wherein: said housing has a substantially vertical front surface; said hanger means includes:

a hanger assembly projecting from said front surface, said hanger assembly including a hanger portion for receiving said handset, said hanger portion being formed at an upper portion of said hanger assembly, and hollow projections formed at a lower portion of said hanger assembly;

slits of said card insertion port are formed in end faces of said projections; and said card reader is partially housed in said projections.

3. A telephone set according to claim 2, wherein said hanger assembly includes a vertically extending groove for housing a grip portion of said handset hung up on said hanger assembly, said groove providing a space for fingers so that the fingers of a user are not brought into contact with a wall portion of said hanger assembly when the user pinches an edge of a card to be inserted into or removed from said card insertion port.

4. A telephone set according to claim 3, wherein said card reader includes:

a pair of base plates spaced apart from each other;

notch portions, shapes of which correspond to a cross-sectional shape of said groove, formed at central portions of front edges of said base plates, respectively; and a magnetic head for reading magnetic information recorded in a card to be inserted in a base plate portion left at the side of said notches.

5. A telephone set according to claim 1, further comprising switching means provided at a rear end portion of said card reader, said switching means being operated by a card when the card is completely inserted in said card reader to operate said card reader.

6. A telephone set according to claim 1, wherein said housing includes a recess formed in a surface of said housing for housing part of said handset, said recess being formed at a portion of said housing behind said handset when said handset is hung up on said hanger means, and said card insertion port is formed at a deep wall portion of said housing defining said recess.

7. A telephone set according to claim 1, wherein said hanger means comprises a hanger recess having a shape corresponding to a shape of said handset, and said card insertion port is formed across said hanger recess.

8. A telephone set according to claim 7, wherein said card insertion port is formed in a portion of said hanger recess which corresponds to a grip portion of said handset.

9. A telephone set according to claim 7, wherein said card insertion port is formed in a portion of said hanger recess which corresponds to a transmitter of said handset.

10. A telephone set according to claim 7, wherein said card insertion port is formed in a portion of said hanger recess which corresponds to a receiver of said handset.

* * * * *